US012796600B2

(12) United States Patent
Shearer et al.

(10) Patent No.: US 12,796,600 B2
(45) Date of Patent: Nov. 17, 2026

(54) MULTI SECTION FLEXIBLE STRIPPER HEADER

(71) Applicant: Concurrent Engineering Inc., Winnipeg (CA)

(72) Inventors: Bruce Robert Shearer, Winnipeg (CA); Russell George Lyons, Winnipeg (CA)

(73) Assignee: Concurrent Engineering Inc., Winnipeg (CA)

( * ) Notice: Subject to any disclaimer, the term of this patent is extended or adjusted under 35 U.S.C. 154(b) by 344 days.

(21) Appl. No.: 18/583,048

(22) Filed: Feb. 21, 2024

(65) Prior Publication Data

US 2025/0261588 A1 Aug. 21, 2025

(51) Int. Cl.

*A01D 41/06* (2006.01)
*A01D 41/12* (2006.01)
*A01D 45/30* (2006.01)

(52) U.S. Cl.

CPC ............. *A01D 41/06* (2013.01); *A01D 41/12* (2013.01); *A01D 45/30* (2013.01)

(58) Field of Classification Search

CPC .... A01D 34/28; A01D 34/283; A01D 34/286; A01D 47/00; A01D 41/144; A01D 41/12; A01D 41/14; A01D 41/06; A01D 45/02; A01D 45/00; A01D 45/30

See application file for complete search history.

(56) References Cited

U.S. PATENT DOCUMENTS 1,370,919 A * 3/1921 Schaefer ................ A01D 41/08 56/130
3,184,905 A * 5/1965 Hillier .................... A01D 47/00 56/130
4,487,004 A * 12/1984 Kejr ....................... A01D 41/14 56/297
4,991,385 A * 2/1991 Klinner .................. A01D 47/00 56/364
5,175,984 A * 1/1993 Hale ...................... A01D 41/06 56/130
5,299,413 A * 4/1994 Gale .................... A01D 41/141 56/121.46
5,419,107 A * 5/1995 Shelbourne ............ A01D 41/06 56/130
5,438,818 A * 8/1995 Shelbourne ............ A01D 41/06 56/130

(Continued)

*Primary Examiner* — Adam J Behrens

(74) *Attorney, Agent, or Firm* — Adrian D. Battison; Ryan W. Dupuis; Ade & Company Inc.

(57) ABSTRACT

A stripper header for combine includes a header frame carrying a stripper rotor with crop stripper elements and a transfer rotor or auger behind to transfer the collected heads to the feeder house. The header, stripper rotor and transfer auger are all divided into at least two typically three sections arranged end to end to pivot about a hinge line to accommodate changes in ground level. The hinge line passes through the axis of each of the stripper rotor and the transfer rotor. The stripper rotor has at the outer end of the center section a support plate spaced from the hinge line and a short portion with a coupling joint which connects to the inboard end of the wing section. The crop engaging elements of the sections of the stripper rotor are arranged so that they intermesh at the junction between the sections where this prevents interference and ensures no gaps.

17 Claims, 8 Drawing Sheets

(56) References Cited

U.S. PATENT DOCUMENTS

| | | | | |
|---|---|---|---|---|
| 5,557,912 | A * | 9/1996 | Voss | A01D 41/06<br>56/130 |
| 6,315,659 | B1 * | 11/2001 | Shelbourne | A01D 41/06<br>460/122 |
| 7,614,206 | B2 * | 11/2009 | Tippery | A01D 41/144<br>56/15.8 |
| 7,992,372 | B1 * | 8/2011 | Coers | A01D 41/14<br>56/153 |
| 9,526,206 | B2 * | 12/2016 | Schulze | A01D 41/06 |
| 10,178,832 | B2 * | 1/2019 | Fink | A01F 12/444 |
| 11,026,369 | B2 * | 6/2021 | Pratt | A01D 43/10 |
| 11,224,165 | B2 * | 1/2022 | Cook | A01D 45/021 |
| 11,659,786 | B2 * | 5/2023 | Huergo | A01D 47/00<br>56/153 |
| 2008/0295473 | A1 * | 12/2008 | Tippery | A01D 41/144<br>56/153 |
| 2013/0219847 | A1 * | 8/2013 | Miller | A01D 43/08<br>56/156 |
| 2018/0035598 | A1 * | 2/2018 | Wenger | A01D 34/04 |
| 2020/0221639 | A1 * | 7/2020 | Pratt | A01D 43/063 |
| 2020/0344951 | A1 * | 11/2020 | Vandeven | A01D 41/141 |
| 2021/0153434 | A1 * | 5/2021 | Hunt | A01D 41/127 |
| 2024/0008412 | A1 * | 1/2024 | Riffel | A01F 12/22 |

* cited by examiner

MULTI SECTION FLEXIBLE STRIPPER HEADER

This invention relates to a stripper header for attachment to a combine harvester to harvest a standing crop which includes a header frame having an attachment system for attachment to a feeder house of the combine harvester where the header frame extends across a width of the header for movement with the combine harvester in a forward direction across ground carrying the standing crop. Stripper headers of this type include a stripper rotor mounted on the header frame having a plurality of crop engaging elements extending outwardly from the axis for engaging the crop as the stripper rotor rotates so as to strip heads of the crop for collection and a transfer rotor or auger mounted on the header frame behind the stripper rotor to transfer the collected heads to the feeder house.

BACKGROUND OF THE INVENTION

Stripper headers which use a rotating drum and fingers to strip off the seeds from the plant were developed in the 1990s.

Crop strippers are best known for stripping grain from the heads of cereal crops such as wheat, and feed from herbage crops such as grass, but they can also be arranged to harvest other grain or seed crops, or to strip other parts of plants, such as leaves, young shoots or blossom from the stems of crops.

The rotor or stripper drum of a crop stripper has stripper teeth projecting from its periphery, arranged in a series of transversely extended rows or combs, each row usually being made up of a number of similar comb plates, butted end to end. Although many different tooth forms have been proposed in the literature, in practice the customary tooth profile comprises a radially outwardly tapering outer portion extending from a radially inner portion in which the spacing between adjacent teeth increases to form a bulbous root opening having a maximum width greater than the width of a radially outer neck of the opening at the junction with the tapering outer portions of the teeth.

In the operation of the-crop stripper, the rotor is driven as the machine advances through the standing crop, the lower periphery of the rotor turning in the direction of advance, and the plant stems are trapped in the spaces between the projecting teeth. As the stems are drawn through the teeth, the grain or other crop is stripped from the stems.

The material is then carried upwardly and rearwardly from the stripper drum and deposited onto a rotating auger drum which carries the separated heads along the header to the discharge mouth at the feeder house of the combine.

Two of the key parameters for efficient and low seed loss performance are the distance the stripper rotor is from the ground and the relative position of the deflector to the rotor to direct the seeds back to the conveying auger. Headers in the 1990s typically were less than 36 ft wide. As combines have increased in capacity, so too has the need for wider stripper headers. These wider headers become more challenging to set the ideal height above the ground because the ground tends to vary more vertically with increased width.

Since the 1990s many crops tend to be shorter by breeding and chemical application to prevent energy from being wasted into the stem. Shorter crops require the rotor to run closer to the ground to strip the seeds off.

If the rotors contact the ground or rocks they tend to be damaged easily which reduces performance and are costly to replace repeatedly. Combine operators are forced to closely monitor the height of the stripper rotor to capture all seeds while not contacting the ground.

All known stripper headers are rigid framed with no ability to contour to the land within the width of the machine. This would be a desirable feature but due to the requirement that the fingers of the rotor must not have any gaps which would leave strips of seeds in standing crop, has not been achieved to date.

SUMMARY OF THE INVENTION

According to the invention there is provided a stripper header for attachment to a combine harvester to harvest a standing crop comprising:

- a header frame having an attachment system for attachment to a feeder house of the combine harvester, the header frame extending across a width of the header for movement with the combine harvester in a forward direction across ground carrying the standing crop;
- a stripper rotor mounted on the header frame across the width of the header frame for rotation relative to the header frame about an axis longitudinal of the stripper rotor;
- the stripper rotor having a plurality of crop engaging elements extending outwardly from the axis for engaging the crop as the stripper rotor rotates so as to strip heads of the crop for collection;
- a transfer rotor mounted on the header frame across the width of the header frame for rotation relative to the frame about an axis longitudinal of the transfer rotor;
- the transfer rotor having a crop head engaging elements for engaging the crop heads as the stripper rotates so as to carry the crop heads along the header frame to the feeder house for collection and operation by the combine harvester;
- the header frame being divided into at least two sections arranged end to end along the header and connected at a hinge line in a hinge plane extending in the forward direction so that one of the at least two sections can pivot in pivotal movement upwardly and downwardly relative to another of the at least two wing sections so as to follow changes in height of the ground;
- the stripper rotor being divided into at least two sections arranged end to end along the header and connected at or adjacent the hinge plane so that the stripper rotor sections can pivot to accommodate sad pivotal movement of the header frame;
- and the transfer rotor being divided into at least two sections arranged end to end along the header and connected at or adjacent the hinge plane so that the transfer rotor sections can pivot to accommodate sad pivotal movement of the header frame.

In a preferred or typical arrangement, the header can comprise a center section attached to the feeder house and two wing sections where the wing sections can pivot in said pivotal movement upwardly and downwardly relative to the center section so as to follow changes in height of the ground.

Preferably each of the sections of the header frame include ground engaging elements, which can be wheels or skids, on each section to maintain a height from the ground of the stripper rotor of the respective section.

Preferably there is provided a suspension connection between the frame sections so that weight from one section is transferred to the other section. The suspension connection typically can use springs. This may include a compression spring below the hinge line and a tension spring above the hinge line. It may alternatively use a tension spring below, by using a support structure that overlaps the header section to make it work like a compression spring. The suspension connection typically supports only part of the weight of the supported section so that the remaining weight is applied to the ground through the skid to ensure constant ground contact. The springs may be adjusted by hydraulic cylinders to enable float settings from a cab.

In accordance with one important but optional aspect of the invention, the hinge line passes through the axis of the stripper rotor. In this way the stripper rotor is not required to slide laterally along the axis as the sections pivot. The hinge line can also pass through the axis of the transfer rotor. In this way neither the stripper rotor nor the transfer rotor are required to slide laterally along the axis as the sections pivot. It is also possible to move the pivot axis down from the transfer rotor and likely have something that still works as it is easier to deal with lateral movement in the auger than the stripper rotor. That is the hinge line in which the header sections pivot is preferably directly through the stripper rotor axis but could be adjacent to the axis of the transfer rotor and can be as much as 3 or 4" away from the axis of the transfer rotor. Any more than that and this design wont work very well.

Preferably the hinge line is defined structurally on the header frame by pivot hinges at a front bearing location on the frame between the stripper rotor and the transfer rotor and a second bearing location on the frame behind the transfer rotor Preferably the front bearing location is very close to the frame members and provides a robust front mounting pivot point that is not in the crop flow. Preferably the hinge line is defined structurally also by the connection between the sections of the stripper rotor and the axis thereof and by the connection between the sections of the transfer rotor and the axis thereof.

In accordance with one important but optional aspect of the invention, the stripper rotor has at an end of said one section a support plate spaced from the hinge line forming a connection connecting said one section with said other section and there is provided outboard of said connection a short portion of said stripper rotor which is concentric to said one section and at the end of the short portion there is provided a coupling joint which connects to the inboard end of said other section of the stripper rotor.

In accordance with one important but optional aspect of the invention, the crop engaging elements of the sections of the stripper rotor are arranged so that they intermesh at the junction between the sections where this intermeshing prevents interference of the crop engaging elements and ensures no gaps between the crop engaging elements. Preferably the crop engaging elements of the sections of the stripper rotor are carried on a cylindrical drum of each section where the drum of each section has an end edge which is recessed with alternate recesses and projections which intermesh with alternate projections and recesses on the other drum. Preferably each section includes rows of the crop engagement elements at spaced positions around the axis and wherein the rows of one are angularly offset from the rows of other. Preferably the intermeshing crop engaging elements at the ends of the sections are longitudinally offset from a support plate carrying the sections.

Thus the solution presented herein relates to the creation of a multi-section header with pivotal connection which allows the sections to pivot relative to one another. Typically this arrangement provides a three section header where the header is divided into 3 sections. The center section is attached to the combine and the outer sections form pivotal wings. This could in one example provide three 15 ft sections in a 45 ft header. This provides better following action for the ground contour than one 30 foot header and also provides an increase in width which better matches the required input volume of a modern combine harvester.

The two outer wings are able to flex up and down on pivots where they are attached to center section. An angle of pivot typically would be in the range of 3-5 degrees.

The wings are spring loaded to suspend most of the wing weight relative to the center section.

The axis of the pivot for the wings passes through the center of the stripper rotor and the center of the transfer rotor or auger. Typically, the transfer rotor includes a helical flight to carry the material to the feeder house as it rotates but other transfer arrangements can be used. The reason for this is to remove the need for either the rotor or the auger to laterally slide as the wing moves up and down. Both the rotor and the auger are rotating, driven elements and creating a joint that also slides is difficult to prevent wear and creates extra clearances between the bats/augers that will be detrimental to performance.

This axis for the pivot is also important structurally as it provides a bearing location in between the rotor and the auger (inside the front of the auger trough). This is very close to the frame members and allows a robust wing front mounting pivot point that is not in the crop flow.

The springs to suspend the wings may be placed above, below, or on both sides of the pivot axis. Placing both above and below may be useful because of the large amount of weight to suspend, and the reduction in forces through the pivot bearings.

Each of the 3 sections has a skid shoe or gauge wheel to control the height. There is no "balancing" mechanism to balance out the loads between the sections, but just a basic float adjustment for each wing. This could be a threaded adjustment or hydraulically controlled from the cab via cylinders. Because stripper headers are normally used in dry conditions there is not a significant need to keep the weight of the 3 sections distributed precisely.

Some stripper headers have ground following dongles to set the height of the feeder house of the combine to ensure the preferred load on the ground engaging elements. This can be used also to control the angle or twist of the feeder house around a forward axis to accommodate ground which slopes to one side or the other relative to the combine harvester. The multi section header arrangement can also use these arrangements.

DETAILED DESCRIPTION

Figure 1:
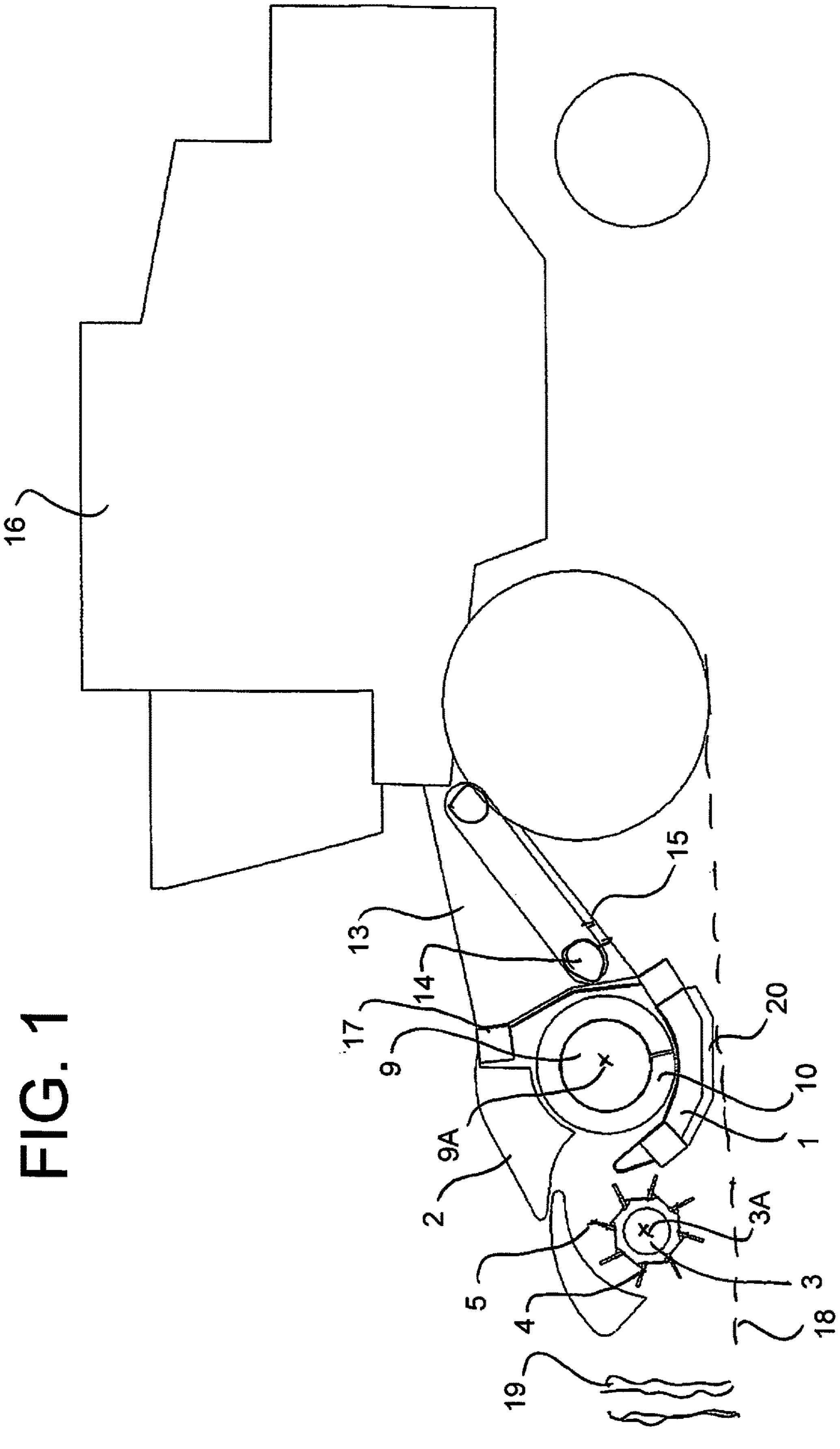
FIG. 1 is transverse cross-sectional view through a combine harvester and stripper header to show the basic construction of such headers.
Figure 2:
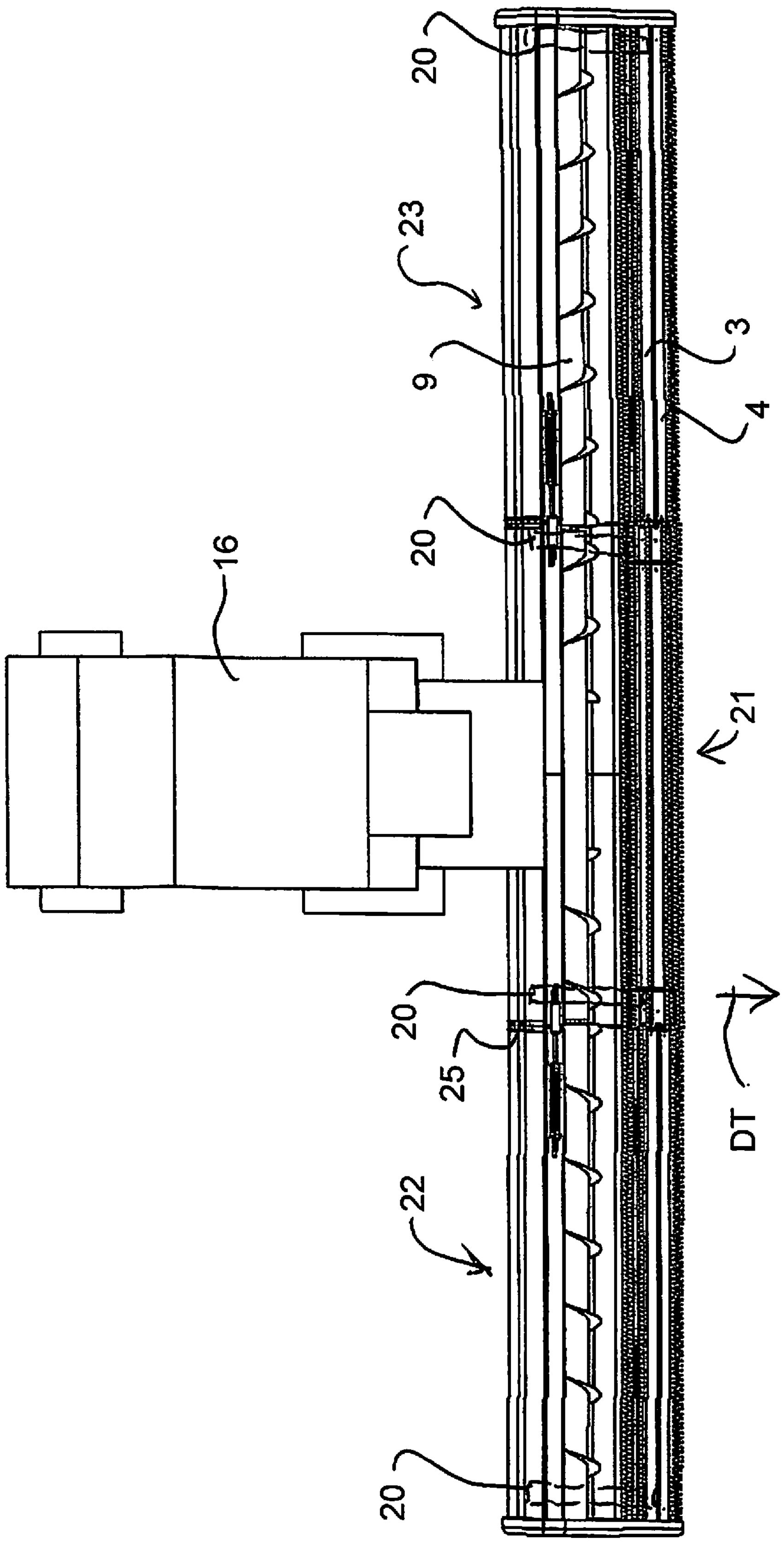
FIG. 2 is a top plan view of a stripper header according to the present invention with the covers omitted mounted on the combine harvester.

A conventional header for stripping of standing crops is shown in FIGS. 1 and 2 comprises a housing 1 with a guide casing 2, a stripper rotor 3, on which the stripper combs 4 with the teeth 5 are mounted uniformly at angularly spaced positions around the entire perimeter. The shape of the stripper teeth or crop engaging elements is known in the prior art and this part of the arrangement is not relevant to the present invention. As shown the combs 4 are inclined forwardly in the direction of rotation shown at D.

A transfer rotor in the form of an auger 9 with the auger flight 10 along the edges is mounted behind the stripper rotor within the housing 1 to receive the stripped heads. The transfer rotor 9 carries the collected heads inwardly toward a feeder house 13 with a feed elevator 14 forming a conveyor 14 with blades 15. The feeder house forms part of a combine harvester 16 with crop processing components of a conventional construction.

The stripper header thus comprises the header frame 1 having an attachment system 17 for attachment to the feeder house 13 of the combine harvester 16. The header frame 1 extends across a full width of the header for movement with the combine harvester in a forward direction across the ground 18 carrying the standing crop 19.

The frame includes covers to guide the crop to the required location. Again this are not relevant to the invention and are shown only schematically and are removed from most figures to show the construction of the relevant components. The frame includes ground engaging components 20 to maintain the height of the frame and thus the stripper rotor from the ground 18. In this embodiment the components 20 comprise a series of skids at spaced positions across the header. However ground wheels may be used.

The stripper rotor 3 is mounted on the header frame across the width of the header frame for rotation relative to the header frame about an axis 3A longitudinal of the stripper rotor. The stripper rotor 3 has a plurality of crop engaging elements in the form of the combs 4 extending outwardly from the axis 3A for engaging the crop as the stripper rotor rotates so as to strip the heads of the crop 19 for collection in the combine harvester.

The transfer rotor in the form of the auger 9 is mounted on the header frame across the width of the header frame for rotation relative to the frame about an axis 9A longitudinal of the transfer rotor. The transfer rotor 9 has crop head engaging elements in the form of the auger flight or flights 10 for engaging the crop heads as the stripper rotor rotates so as to carry the crop heads along the header frame to the feeder house 13 for collection and threshing by the combine harvester 16.

In accordance with the key feature of the present invention, the header frame 1 is divided into at least two sections arranged end to end along the header. The header can comprise only two sections where one is connected to the feeder house and the other is a wing. However in the arrangement shown there are three sections including a center section 21 and two wing sections 22 and 23. The wing sections are each connected to the center section 21 at a respective hinge coupling 24.

Figure 3:
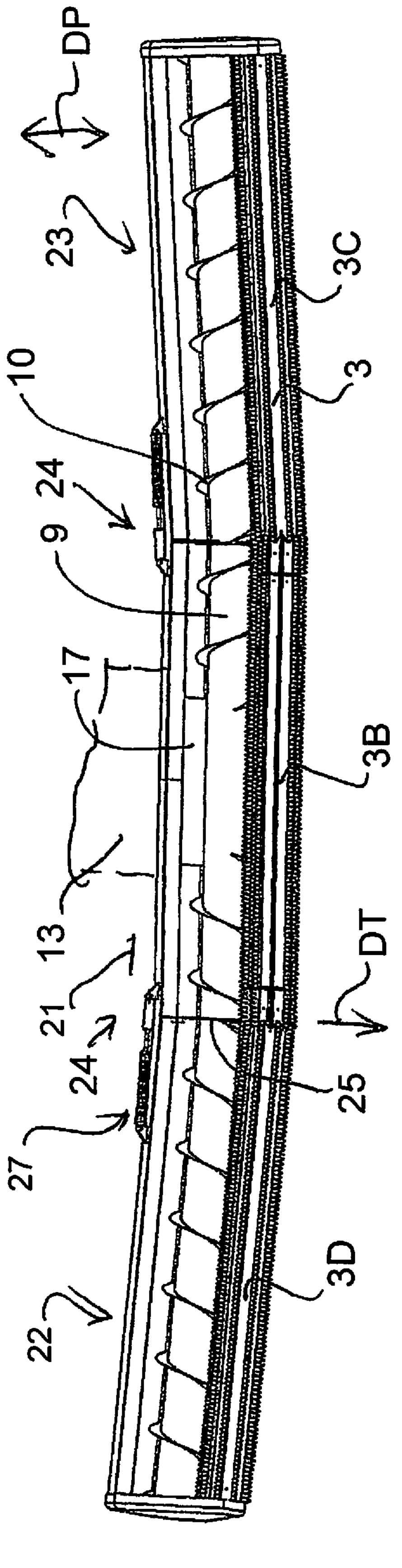
FIG. 3 is a front elevational view of the stripper header of FIG. 2 according to the present invention with the covers omitted.
Figure 4:
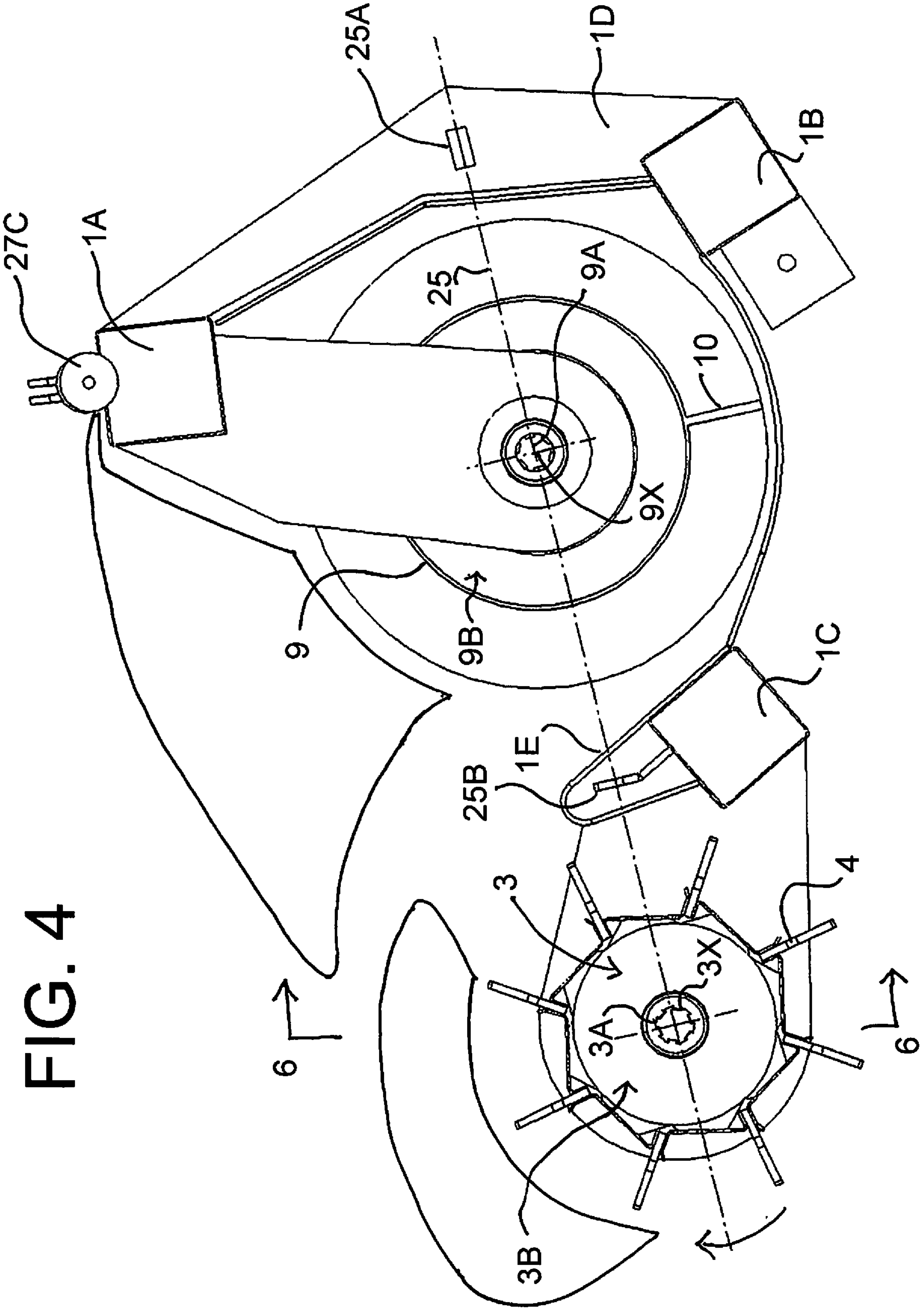
FIG. 4 is transverse cross-sectional view through the stripper header of FIG. 3.

As best shown in FIG. 4, the wing section 23 is connected to the center section at the hinge connection shown in cross-section in FIG. 4. The hinge connection defines a specific hinge line about which the pivotal movement takes place which is shown at 25. This extends in the forward direction of travel indicated at DT in FIG. 3. This hinge line allows the wing section 23 to pivot in pivotal movement upwardly and downwardly as shown at DP relative to the center section 21 so as to follow changes in height of the ground 18.

In order to accommodate this pivotal movement of the header frame, the stripper rotor 3 is divided into three sections 3B, 3C and 3D arranged end to end along the header and connected at or adjacent the hinge line 25 so that the stripper rotor sections also pivot. Similarly the transfer rotor 9 being divided into three sections 9B, 9C and 9D arranged end to end along the header and connected at or adjacent the hinge line 25 so that the transfer rotor sections also can pivot to accommodate the pivotal movement of the header frame.

Each of the sections 21, 22 and 23 of the header frame include ground engaging elements or skids 20 on each section to maintain a height from the ground of the stripper rotor of the respective section. As shown the center section includes two skids at or adjacent respective ends and the wing sections include only one skip at or adjacent the outer end. In this way the three sections can take up a position determined by the height of the ground at that section with the header pivoting as shown in FIG. 3 to allow the section concerned to remain at the required height.

The wing sections are supported from the central section by the hinge coupling 24 and by a suspension connection 27 between the frame sections so that weight from the wing section is transferred to the center section. The suspension connection 27 comprises a compression spring connected 27B below hinge line and a tension spring 27A above the hinge line 25. The two springs together are arranged support only part of the weight of the wing section. At least one of the springs is adjusted by hydraulic cylinder 27C to enable float settings from a cab of the combine harvester.

Figure 8:
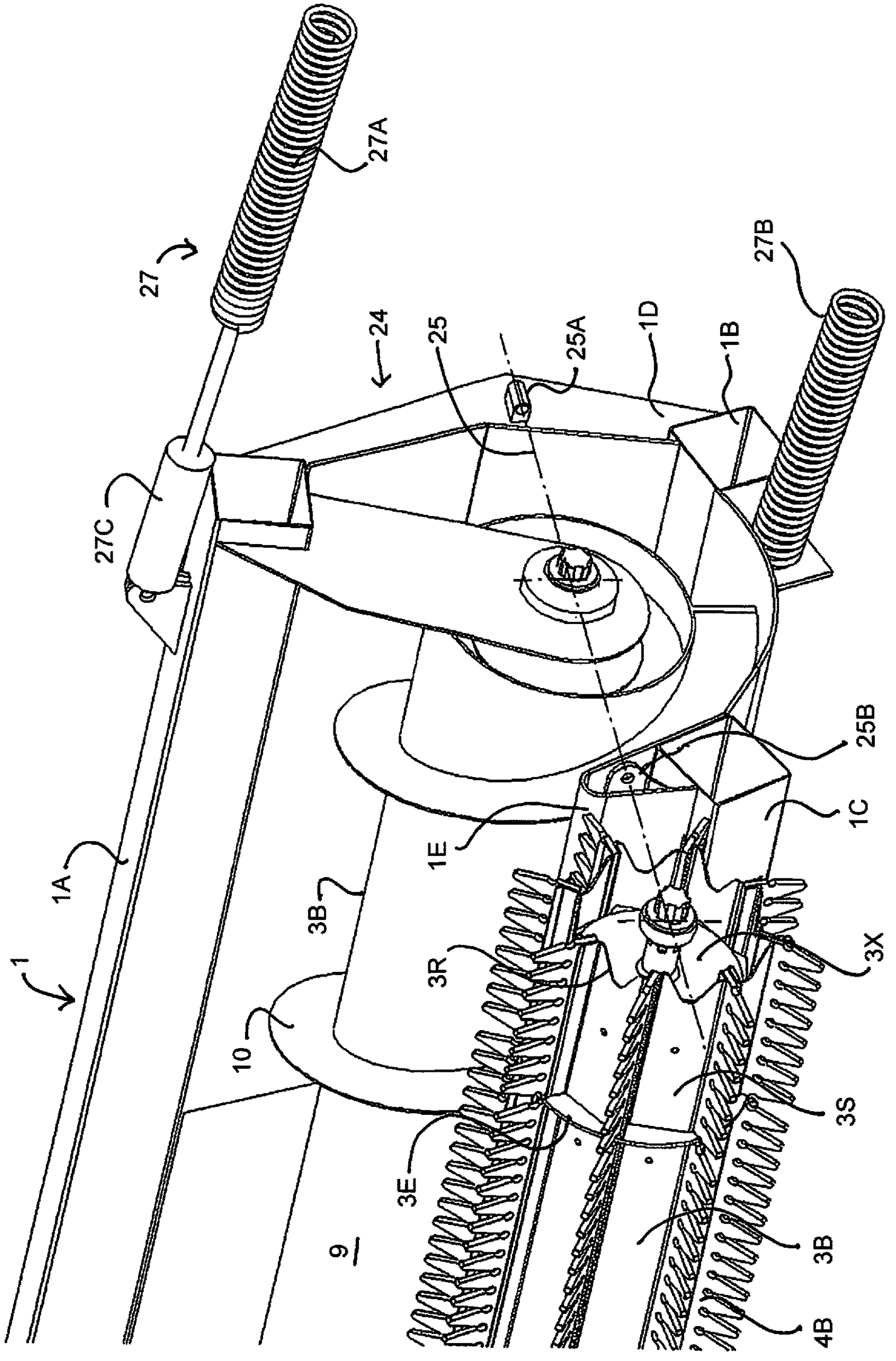
FIG. 8 is an isometric view of the stripper header of FIG. 3 showing the coupling between two sections with the wing section removed to show the connection at the end of the center section.

As best shown in FIGS. 4 and 8, the hinge line 25 passes through the axis 3A, 9A of each of the stripper rotor 3 and the transfer rotor 9. In this way neither the stripper rotor 3 nor the transfer rotor 9 is required to laterally slide along the respective axis as the sections pivot.

As shown in FIG. 8, the hinge line 25 is defined structurally on the header frame by two pivot hinges 25A and 25B on the header frame. These provide a strong structural connection at a front bearing location 25B on the frame 1 between the stripper rotor 3 and the transfer rotor 9 and a second bearing location 25A on the frame 1 behind the transfer rotor 9. Thus as shown the frame 1 includes main longitudinal beams 1A, 1B and 1C forming an elongate structure along the frame where the beams are connected by suitable struts including C-shaped strut 1D between the beams 1A and 1B. The bearing 25A is carried on the strut 1D directly behind the axis 9A of the transfer rotor. The bearing 25B is carried on a bracket 1E supported on the beam 1C. Thus the frame can pivot around the hinge line 25 as previously described to follow better the ground contour.

The front bearing location 25B is very close to the frame member 1C and provides a robust front mounting pivot point providing the pivot action with little distortion or flexing. The front pivot location 25B is also behind the stripper rotor so that is not in the crop flow where the heads are stripped and pass over the stripper rotor and the beam 1C to the transfer rotor 9.

The hinge line 25 is defined by and structurally supported also by the connection between the sections of the stripper rotor 3 and the axis 3A thereof and by the connection between the sections of the transfer rotor 9 and the axis 9A thereof. That is, as shown in FIG. 4, the center section 3B of stripper rotor 3 includes a coupling 3X which provides communication of drive between the sections 3B and 3C. A symmetrical coupling is provided at the opposite end of the section 3B. The drive to the stripper rotor can be provided to any one of the sections but preferably is located at one end of the frame form communications from one wing section through the center section to the other wing section. The same applies to the transfer rotor which has a coupling 9X at the end of the center section 9B as shown. The ends of the center sections 3B and 9B are supported as described below so that the couplings are at a fixed location relative to the frame and these elements also provide structural support at the hinge line 25.

Figure 6:
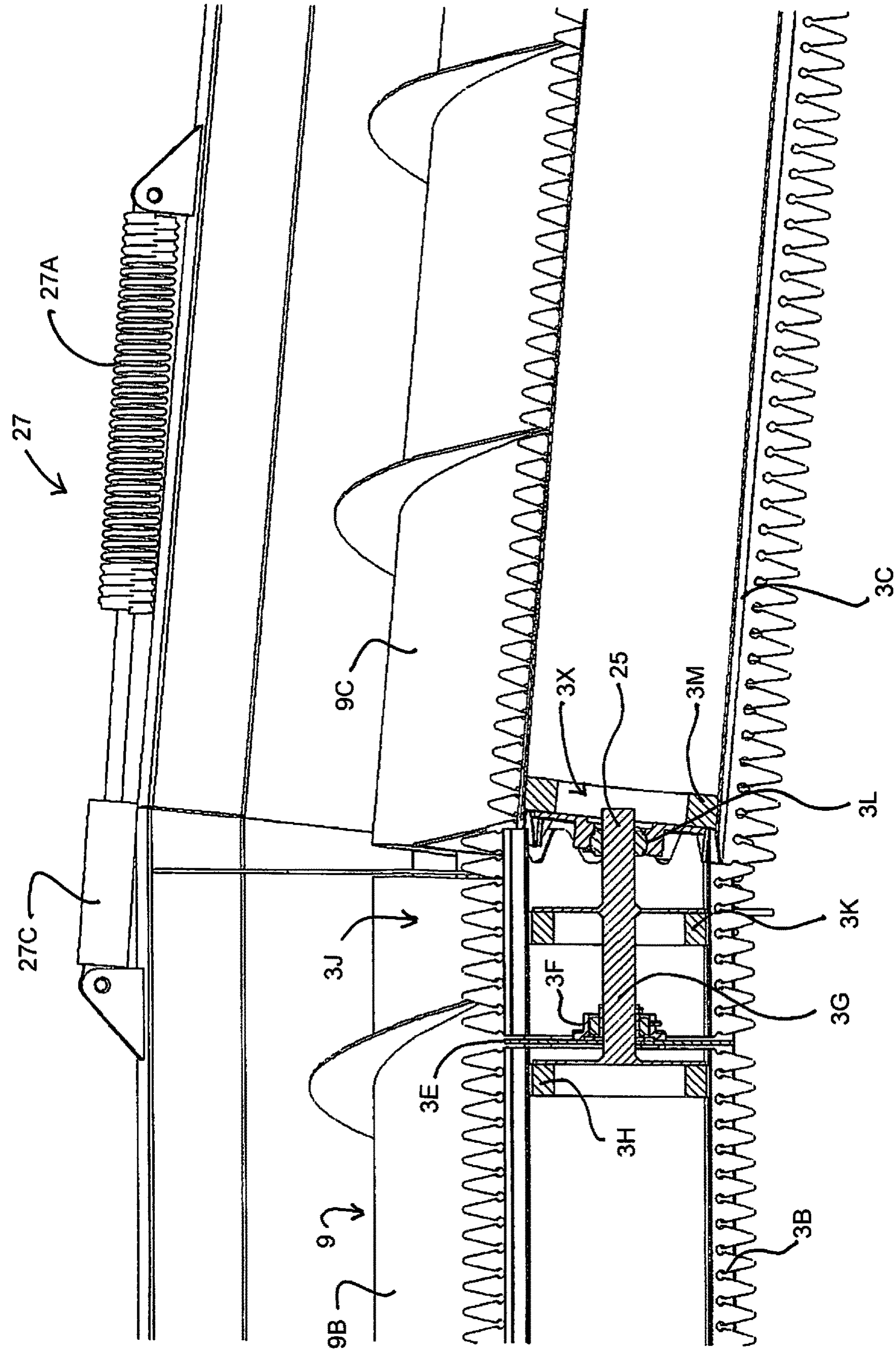
FIG. 6 is a cross sectional view along the lines 6-6 of FIG. 4 showing the coupling between two sections at the coupling between the two sections of the stripper

As best shown in FIG. 6, the center section 3B of the stripper rotor 3 has at one end a support plate 3E which is connected to the beam 1C and carries a bearing 3F supporting a shaft 3G extending along the axis 3A. The shaft 3G carries the outer end of the center section 3B on a support disk 3H so that the end of the section 3B is accurately maintained on the axis 3A by the plate 3E and the bearing 3F.

The plate 3E is however spaced from the hinge line 25 and there is provided outboard of the plate 3E a short portion 3J of the stripper rotor which is maintained concentric to the center section by its support on the shaft 3G by a support disk 3K on the shaft. Thus the center section 3B including the short stub portion 3J of the section 3B are coaxial and rotate commonly around the axis 3A as supported by the plate 3E and the shaft 3G.

At the end of the short portion 3J there is provided a coupling joint 3L carried on the shaft 3G which forms a CV joint or universal joint and acts to connect to the inboard end of the section 3C of the stripper rotor. This connects to the inboard end of the section 3C by a support disk 3M In this way, the hinge line 25 defining the intersection between the section 3B and 3C is spaced outwardly from the support plate 3E so that their functions can be carried out without interference between them.

A symmetrical arrangement is provided at the end of the center section 3B for supporting and driving the wing section 3A.

It is important that the ends of the sections 3B and 3C can, during the pivotal movement about the hinge line 25, act on the crop without interference between the ends of the sections and without leaving a space where the crop Is not properly stripped.

Figure 5:
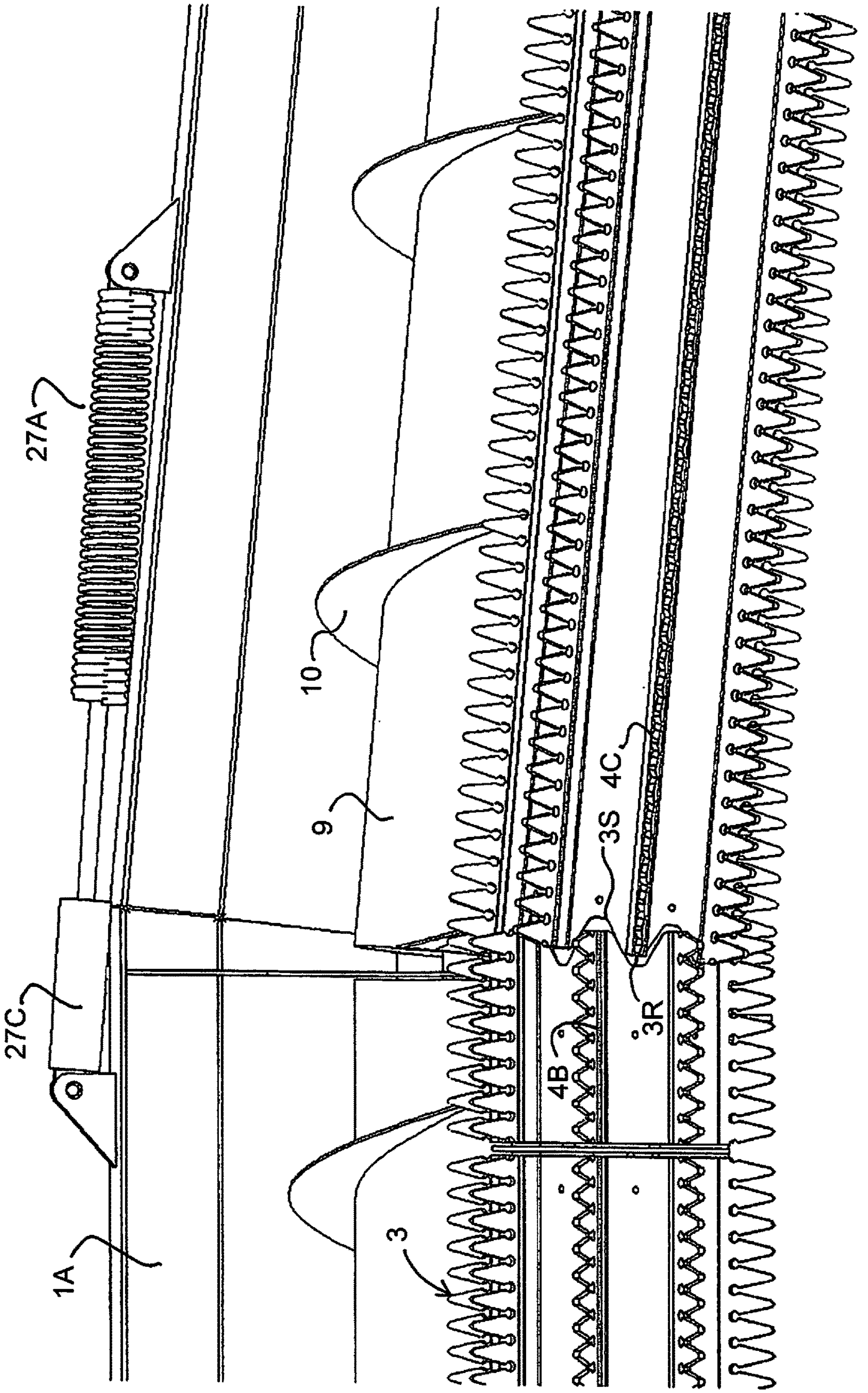
FIG. 5 is a front elevational view of the stripper header of FIG. 3 showing the coupling between two sections on an enlarged scale again with the covers omitted.
Figure 7:
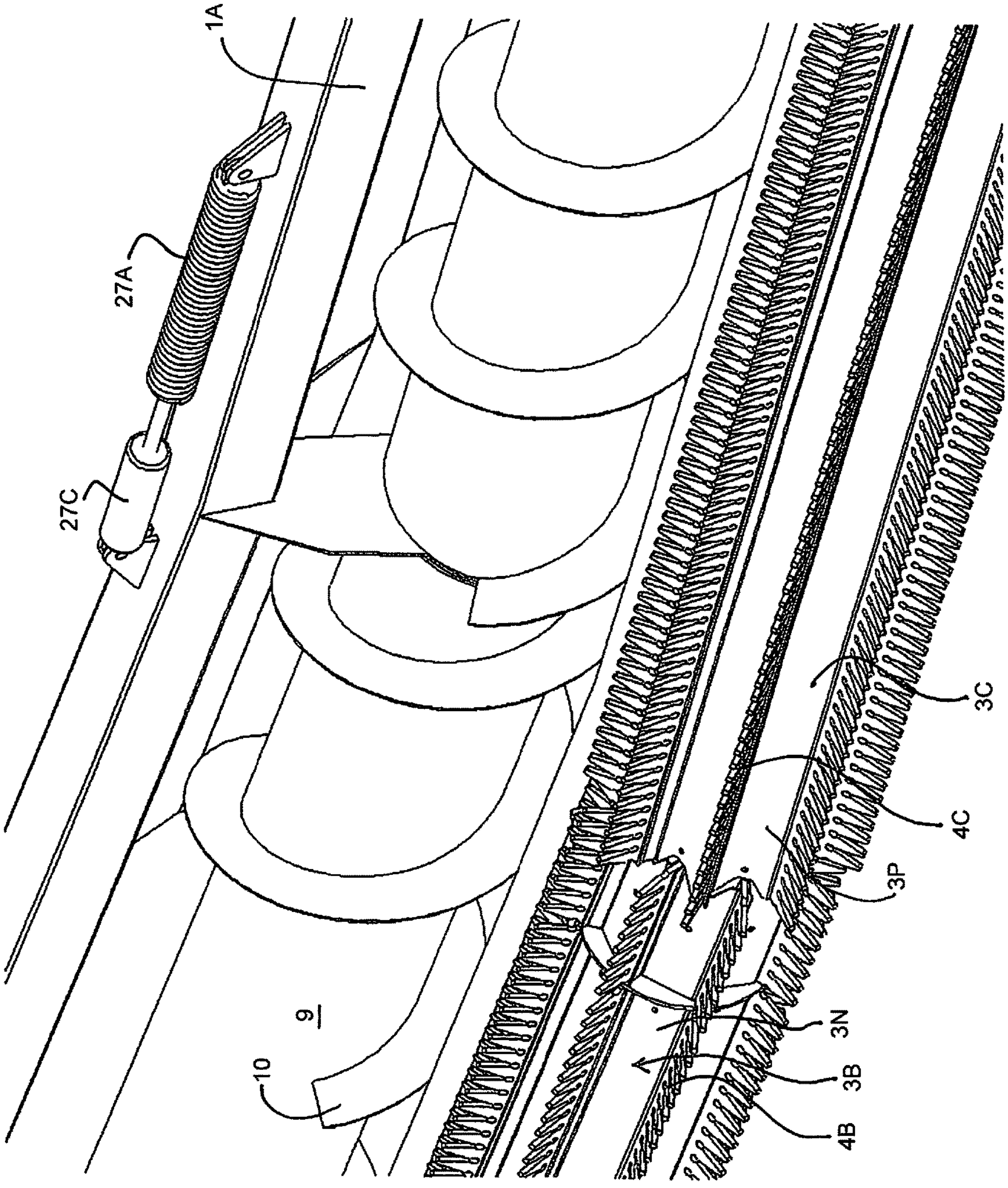
FIG. 7 is an isometric view of the stripper header of FIG. 3 showing the coupling between two sections on an enlarged scale again with the covers omitted.

Thus as best shown in FIGS. 5 and 7, the crop engaging elements or combs 4 of the sections 3B and 3C of the stripper rotor 3 are arranged so that they intermesh at the junction between the sections. This intermeshing prevents physical interference of the crop engaging elements and ensures no gaps between the crop engaging elements.

This intermeshing action is obtained firstly by the mounting of the combs 4B of the section 3C so that they are angularly offset from the combs 4C of the section 3C. that is the combs 4C are rotated around the axis of the rotor 3 by an angle half the angular spacing of the combs.

The crop engaging combs 4B and 4C of the sections 3B and 3C of the stripper rotor are each carried on a cylindrical drum 3N, 3P of each section. Each drum at its ends has an end edge 3R, 3S which is recessed with alternate recesses and projections which intermesh with alternate projections and recesses on the other drum 3N, 3P. this intermeshing edge is best shown in FIG. 5 and provides in effect a sine wave at the end edge. In this way the end of the combs 4B projects beyond the ends of the combs 4C in an intermeshing action which ensures no spaces as the stripper rotates where crop can pass between the ends and not be stripped. This intermeshing action changes as the pivotal movement takes place between fully raise and fully lowered wing positions and the distance of the overlap is arranged to ensure that there is no space at either extreme to ensure no heads remain unstripped at the intersection between the sections as the wing pivot.

The invention claimed is:

1. A stripper header for attachment to a combine harvester to harvest a standing crop comprising:

a header frame having an attachment system for attachment to a feeder house of the combine harvester, the header frame extending across a width of the header for movement with the combine harvester in a forward direction across ground carrying the standing crop;

a stripper rotor mounted on the header frame across the width of the header frame for rotation relative to the header frame about a stripper axis longitudinal of the stripper rotor;

the stripper rotor having a plurality of crop engaging elements extending outwardly from the stripper axis for engaging the crop as the stripper rotor rotates so as to strip heads of the crop for collection;

a transfer rotor mounted on the header frame across the width of the header frame for rotation relative to the frame about a rotor axis longitudinal of the transfer rotor;

the transfer rotor having crop head engaging elements for engaging the crop heads as the stripper rotates so as to carry the crop heads along the header frame to the feeder house for collection and operation by the combine harvester;

the header frame being divided into at least two sections arranged end to end along the header and connected at a hinge line lying in a hinge plane in the forward direction so that one of the at least two sections pivot in pivotal movement upwardly and downwardly relative to another of the at least two sections so as to follow changes in height of the ground;

the stripper rotor being divided into at least two sections arranged end to end along the header and connected at or adjacent the hinge plane so that the stripper rotor sections pivot to accommodate said pivotal movement of the header frame;

and the transfer rotor being divided into at least two sections arranged end to end along the header and connected at or adjacent the hinge plane so that the transfer rotor sections pivot to accommodate said pivotal movement of the header frame.

2. The stripper header according to claim 1 wherein said at least two sections of the header frame comprise a center section attached to the feeder house and two wing sections where said wing sections pivot in said pivotal movement upwardly and downwardly relative to the center section so as to follow changes in height of the ground.

3. The stripper header according to claim 1 wherein each of the at least two sections of the header frame include ground engaging elements on each section of the at least two sections to maintain a height from the ground of the stripper rotor of the respective section of the at least two sections.

4. The stripper header according to claim 1 wherein there is provided a suspension connection between the at least two frame sections so that weight from one section of the at least two sections is transferred to said another section of the at least two sections.

5. The stripper header according to claim 4 wherein the suspension connection comprises springs.

6. The stripper header according to claim 4 wherein the suspension connection comprises a spring arrangement below the hinge line in an extension mode and a spring arrangement above the hinge line in a tension mode.

7. The stripper header according to claim 4 wherein the suspension connection supports only part of the weight of the one section.

8. The stripper header according to claim 5 wherein the springs are adjusted by hydraulic cylinders to enable float settings from a cab.

9. The stripper header according to claim 1 wherein the hinge line passes through the stripper axis of the stripper rotor so that the stripper rotor does not laterally slide along the stripper axis as the at least two stripper sections pivot.

10. The stripper header according to claim 1 wherein the hinge line passes through the rotor axis of the transfer rotor so that the transfer rotor does not laterally slide along the rotor axis as the at least two rotor sections pivot.

11. The stripper header according to claim 10 wherein the hinge line passes through the stripper axis of the stripper rotor so that the stripper rotor does not laterally slide along the stripper axis as the at least two stripper sections pivot.

12. A stripper header for attachment to a combine harvester to harvest a standing crop comprising:

a header frame having an attachment system for attachment to a feeder house of the combine harvester, the header frame extending across a width of the header for movement with the combine harvester in a forward direction across ground carrying the standing crop;

a stripper rotor mounted on the header frame across the width of the header frame for rotation relative to the header frame about a stripper axis longitudinal of the stripper rotor;

the stripper rotor having a plurality of crop engaging elements extending outwardly from the stripper axis for engaging the crop as the stripper rotor rotates so as to strip heads of the crop for collection;

a transfer rotor mounted on the header frame across the width of the header frame for rotation relative to the frame about a rotor axis longitudinal of the transfer rotor;

the transfer rotor having crop head engaging elements for engaging the crop heads as the stripper rotates so as to carry the crop heads along the header frame to the feeder house for collection and operation by the combine harvester;

the header frame being divided into at least two sections arranged end to end along the header and connected at a hinge line lying in a hinge plane in the forward direction so that one of the at least two sections pivot in pivotal movement upwardly and downwardly relative to another of the at least two sections so as to follow changes in height of the ground;

the stripper rotor being divided into at least two sections arranged end to end along the header and connected at or adjacent the hinge plane so that the stripper rotor sections pivot to accommodate said pivotal movement of the header frame;

and the transfer rotor being divided into at least two sections arranged end to end along the header and connected at or adjacent the hinge plane so that the transfer rotor sections pivot to accommodate said pivotal movement of the header frame;

wherein the hinge line is defined structurally on the header frame by pivot hinges at a front bearing location between the stripper rotor and the transfer rotor and a second bearing location behind the transfer rotor;

and wherein the hinge line is defined structurally also by the connection between the at least two sections of the stripper rotor at the axis thereof and by the connection between the at least two sections of the transfer rotor at the axis thereof.

13. A stripper header for attachment to a combine harvester to harvest a standing crop comprising:

a header frame having an attachment system for attachment to a feeder house of the combine harvester, the header frame extending across a width of the header for movement with the combine harvester in a forward direction across ground carrying the standing crop;

a stripper rotor mounted on the header frame across the width of the header frame for rotation relative to the header frame about a stripper axis longitudinal of the stripper rotor;

the stripper rotor having a plurality of crop engaging elements extending outwardly from the stripper axis for engaging the crop as the stripper rotor rotates so as to strip heads of the crop for collection;

a transfer rotor mounted on the header frame across the width of the header frame for rotation relative to the frame about a rotor axis longitudinal of the transfer rotor;

the transfer rotor having crop head engaging elements for engaging the crop heads as the stripper rotates so as to carry the crop heads along the header frame to the feeder house for collection and operation by the combine harvester;

the header frame being divided into at least two sections arranged end to end along the header and connected at a hinge line lying in a hinge plane in the forward direction so that one of the at least two sections pivot in pivotal movement upwardly and downwardly relative to another of the at least two sections so as to follow changes in height of the ground;

the stripper rotor being divided into at least two sections arranged end to end along the header and connected at or adjacent the hinge plane so that the stripper rotor sections pivot to accommodate said pivotal movement of the header frame;

and the transfer rotor being divided into at least two sections arranged end to end along the header and connected at or adjacent the hinge plane so that the transfer rotor sections pivot to accommodate said pivotal movement of the header frame;

wherein one section of the at least two sections of the stripper rotor has at an end a support plate spaced from the hinge line forming a connection connecting said one section with said other section of the stripper rotor and there is provided outboard of said connection a short portion of said stripper rotor which is concentric to said one section of the stripper rotor and at the end of the short portion there is provided a coupling joint which connects to the inboard end of said other section of the stripper rotor.

14. A stripper header for attachment to a combine harvester to harvest a standing crop comprising:

a header frame having an attachment system for attachment to a feeder house of the combine harvester, the header frame extending across a width of the header for movement with the combine harvester in a forward direction across ground carrying the standing crop;

a stripper rotor mounted on the header frame across the width of the header frame for rotation relative to the header frame about a stripper axis longitudinal of the stripper rotor;

the stripper rotor having a plurality of crop engaging elements extending outwardly from the stripper axis for engaging the crop as the stripper rotor rotates so as to strip heads of the crop for collection;

a transfer rotor mounted on the header frame across the width of the header frame for rotation relative to the frame about a rotor axis longitudinal of the transfer rotor;

the transfer rotor having crop head engaging elements for engaging the crop heads as the stripper rotates so as to carry the crop heads along the header frame to the feeder house for collection and operation by the combine harvester;

the header frame being divided into at least two sections arranged end to end along the header and connected at a hinge line lying in a hinge plane in the forward direction so that one of the at least two sections pivot in pivotal movement upwardly and downwardly relative to another of the at least two sections so as to follow changes in height of the ground;

the stripper rotor being divided into at least two sections arranged end to end along the header and connected at or adjacent the hinge plane so that the stripper rotor sections pivot to accommodate said pivotal movement of the header frame;

and the transfer rotor being divided into at least two sections arranged end to end along the header and connected at or adjacent the hinge plane so that the transfer rotor sections pivot to accommodate said pivotal movement of the header frame;

wherein the crop engaging elements of the at least two sections of the stripper rotor are arranged so that they intermesh at a junction between the at least two sections of the stripper rotor where this intermeshing prevents interference of the crop engaging elements and ensures no gaps between the crop engaging elements.

15. The stripper header according to claim 14 wherein the crop engaging elements of the at least two sections of the stripper rotor are carried on a respective cylindrical drum of each section of the stripper rotor where the respective cylindrical drum of each section of the stripper rotor has an end edge which is recessed with alternate recesses and projections which intermesh with alternate projections and recesses on the respective cylindrical drum of each other section of the stripper rotor.

16. The stripper header according to claim 14 wherein each section of the stripper rotor includes rows of the crop engagement elements at spaced positions around the stripper axis and wherein the rows of one are angularly offset from the rows of the other.

17. The stripper header according to claim 14 wherein the intermeshing crop engaging elements at the ends of the at least two sections of the stripper rotor are longitudinally offset from a support plate carrying the at least two sections of the stripper rotor.

* * * * *